July 1, 1930. B. R. BENJAMIN 1,768,972
TRACTOR WHEEL
Filed Jan. 7, 1929
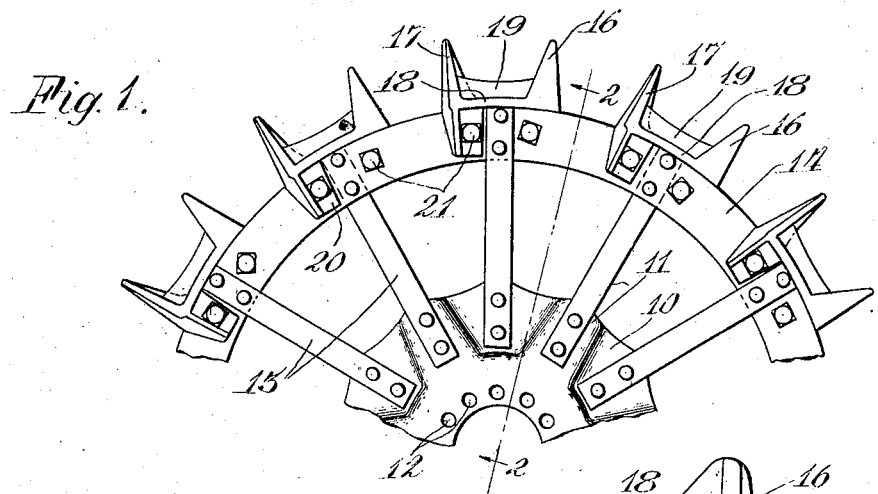
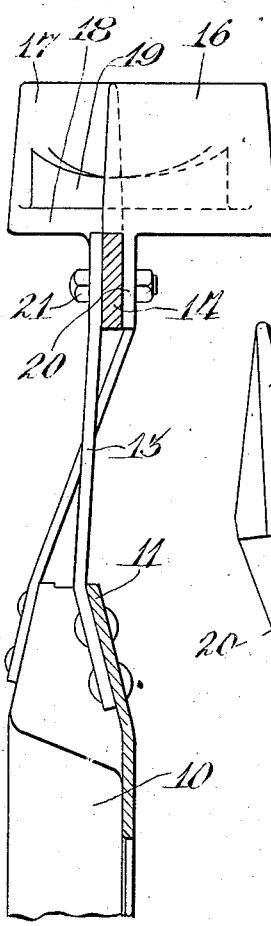
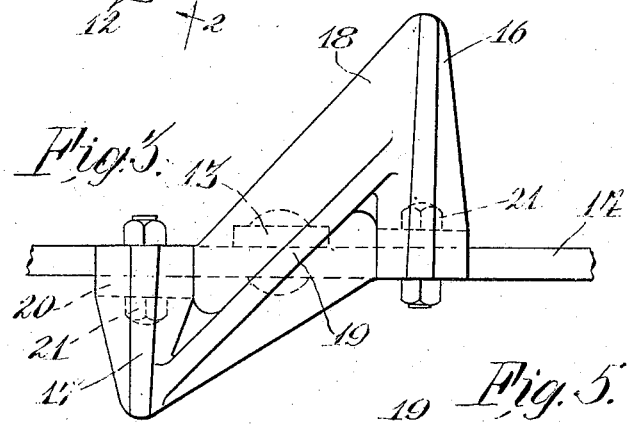
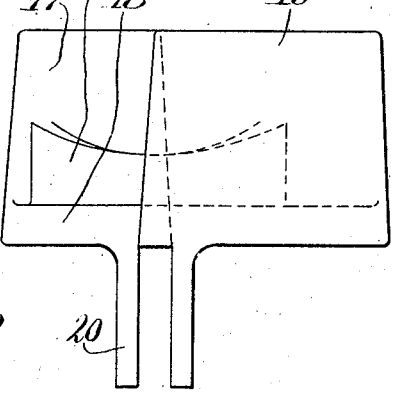
Inventor
Bert R. Benjamin
By H. P. Doolittle
Atty.

Patented July 1, 1930

1,768,972

UNITED STATES PATENT OFFICE

BERT R. BENJAMIN, OF OAK PARK, ILLINOIS, ASSIGNOR TO INTERNATIONAL HARVESTER COMPANY, A CORPORATION OF NEW JERSEY

TRACTOR WHEEL

Application filed January 7, 1929. Serial No. 330,752.

The invention herein disclosed relates to traction wheels of the type employed on farm tractors.

The principal objects of the invention are to provide a strong, light traction wheel having a tread construction particularly adapted for running on muddy and sticky soil and giving efficient traction without picking up soil or packing with soil to an objectionable degree. These objects as well as other objects and advantages are attained in the single rim, skeleton wheel structure herein more particularly described and illustrated in the accompanying drawing, wherein:

Figure 1 is a fragmental side elevation of a traction wheel embodying the invention;

Figure 2 is a vertical, transverse section on an enlarged scale taken on the line 2—2 of Figure 1;

Figure 3 is an enlarged plan view of a section of the wheel tread;

Figure 4 is a side view of one of the tread members forming part of the wheel tread; and, Figure 5 is the tread member of Figure 4 viewed at right angles.

In the present embodiment of the invention, the wheel structure comprises a hub member 10 which is preferably of disk-like form and provided with a radial flange shaped to provide lateral scallops forming alternately offset depressions or spoke seats 11, as disclosed and claimed in patent to Benjamin 1,748,405, February 25, 1930. The hub member may be provided with bolt openings as at 12 for attachment to a permanent hub on the tractor axle. The hub seats 11 have secured thereto a series of spoke members 13 which are preferably flat bars, as shown. These spokes extend outwardly from the hub piece with alternate spokes intersecting each other in a radial plane, so that the outer ends thereof may engage opposite sides of an annular rim plate 14 forming part of the wheel tread. The spokes are secured to the opposite sides of the plate 14 with the ends of the spokes lying flush with the peripheral edge of the plate. The annular plate 14 is set on edge, as shown in Figures 1 and 2, and presents only a narrow surface to the soil. In order to provide adequate traction and supporting surface for the wheel tread, the annular plate 14 carries a series of tread members of novel form on its circumference. These tread members are preferably castings having offset, oppositely extending traction cleats 16, 17 connected by an integral bridge portion 18, which extends diagonally from one cleat to the other, as seen in Figure 3, and which preferably is as wide as the respective cleats are long. The bridge piece 18 is preferably formed with a central strengthening web 19 of less height than the cleats. Below each cleat, the tread member is formed with depending lugs 20, which engage the opposite side faces of the annular plate 14. As the lugs 20 are directly below the cleats 16, 17, they too are in offset relation and the space left between them is substantially equal to the width of the ends of the spokes 13. It follows that the lugs on each tread member are in engagement with the annular plate adjacent each side of the place of connection of a spoke member to the rim plate 14. The lugs 20 are preferably secured to the rim plate by detachable means, such as bolts 21. The bases of the plate members conform in curvature to that of the peripheral edge of the plate 14, and, when the tread members are in position on the plate, the bases will rest on the edge of the plate and on the ends of the spokes. The spacing of the cleats 16, 17 is such as to leave equal spaces between adjacent tread members. This arrangement and relation of the tread members to the rim plate and the spokes provides a structure in which the working thrusts are borne by the strongest parts of the wheel rim adjacent the spokes. The cleats 16 and 17 are preferably of equal height, but the cleat 16 may be of greater length lateraly than the cleat 17, as such dimensions in combination with the dished hub piece 10, permit reversibility of the wheel on the permanent hub without bringing the tread members into contact with the tractor body.

The construction above described is a skeleton wheel structure in which the spokes, rim, and tread members are so related as to give the maximum amount of resistance to working strains, and in which no spaces or closed pockets are formed on the wheel tread in which dirt may become packed. The preferred construction illustrated and described is capable of certain modifications, as will be apparent to those skilled in the art, without departure from the invention as defined in the following claims.

What is claimed is:

1. A wheel structure comprising a hub piece, spokes radiating therefrom, a flat annular plate having its width disposed radially, said spokes being connected alternately to opposite sides of the plate, and a series of spaced tread members seated on the peripheral edge of the annular plate having opposite offset depending lugs secured to opposite sides of the plate at either side of each place of connection of a spoke with the sides of the annular plate.

2. A traction wheel comprising a single annular plate set on edge, a series of spokes connected to a side thereof with the ends of the spokes flush with the peripheral edge of the plate, and a series of tread members seated on the plate over the spoke ends comprising offset radially extending cleats projecting laterally from opposite sides of the plane of the plate connected by a bridge piece extending obliquely across the peripheral edge of the plate, said tread members having depending lugs secured to the plate at either side of the spoke connections.

3. A traction wheel tread structure comprising a single annular plate set on edge, and a series of tread members seated on the periphery of the plate comprising offset radially extending parallel cleats extending laterally from opposite sides of the plane of the plate connected by a bridge piece extending obliquely across the peripheral edge of the plate and having depending portions secured to opposite sides thereof at circumferentially spaced points.

4. A traction wheel tread structure comprising a single annular plate set on edge, parallel cleats fixed on the plate and extending laterally from opposite sides thereof alternately and also extending radially beyond the periphery of the plate, and a bridge piece integral with each pair of opposite cleats extending obliquely across the periphery of the plate.

In testimony whereof I affix my signature.

BERT R. BENJAMIN.